United States Patent [19]

Martija

[11] 4,183,475

[45] Jan. 15, 1980

[54] APPARATUS FOR MOUNTING A HOLLOW CYLINDRICAL MEMBER

[75] Inventor: Henry M. Martija, La Verne, Calif.

[73] Assignee: Bell & Howell Company, Chicago, Ill.

[21] Appl. No.: 933,410

[22] Filed: Aug. 15, 1978

[51] Int. Cl.² .............................................. B65H 17/02
[52] U.S. Cl. ................................. 242/68.3; 242/68.2; 242/72.1; 242/72 R
[58] Field of Search ........................ 242/68.3, 68, 68.1, 242/68.2, 71.8, 72, 72.1, 72 B; 279/2

[56] References Cited

U.S. PATENT DOCUMENTS

| | | | |
|---|---|---|---|
| 2,529,185 | 11/1950 | Proctor | 242/72.1 |
| 2,904,278 | 9/1959 | Riemenschneider | 242/72.1 |
| 3,463,519 | 8/1969 | Raymond | 242/68.3 |
| 4,079,896 | 3/1978 | Plach | 242/72.1 |

Primary Examiner—Edward J. McCarthy
Attorney, Agent, or Firm—Benoit Law Corporation

[57] ABSTRACT

An apparatus for mounting a hollow cylindrical member, such as a magnetic tape reel hub, has an arbor and a chuck longitudinally slidable on such arbor. The chuck includes an expansible device for releasably retaining the hollow cylindrical member and a pair of tensioning members having meshing threads and being coupled to the expansible device for releasably retaining the hollow cylindrical member. A driving member assembly having a pair of driving members with meshing threads for varying the position of the chuck along the arbor is coupled to the arbor and chuck for adjusting the position of the chuck to an axial dimension of the hollow cylindrical member. The tensioning members of the chuck may be arrestable relative to each other to inhibit unintended loosening of the chuck from a retained hollow cylindrical member.

17 Claims, 6 Drawing Figures

U.S. Patent   Jan. 15, 1980   Sheet 1 of 2   4,183,475
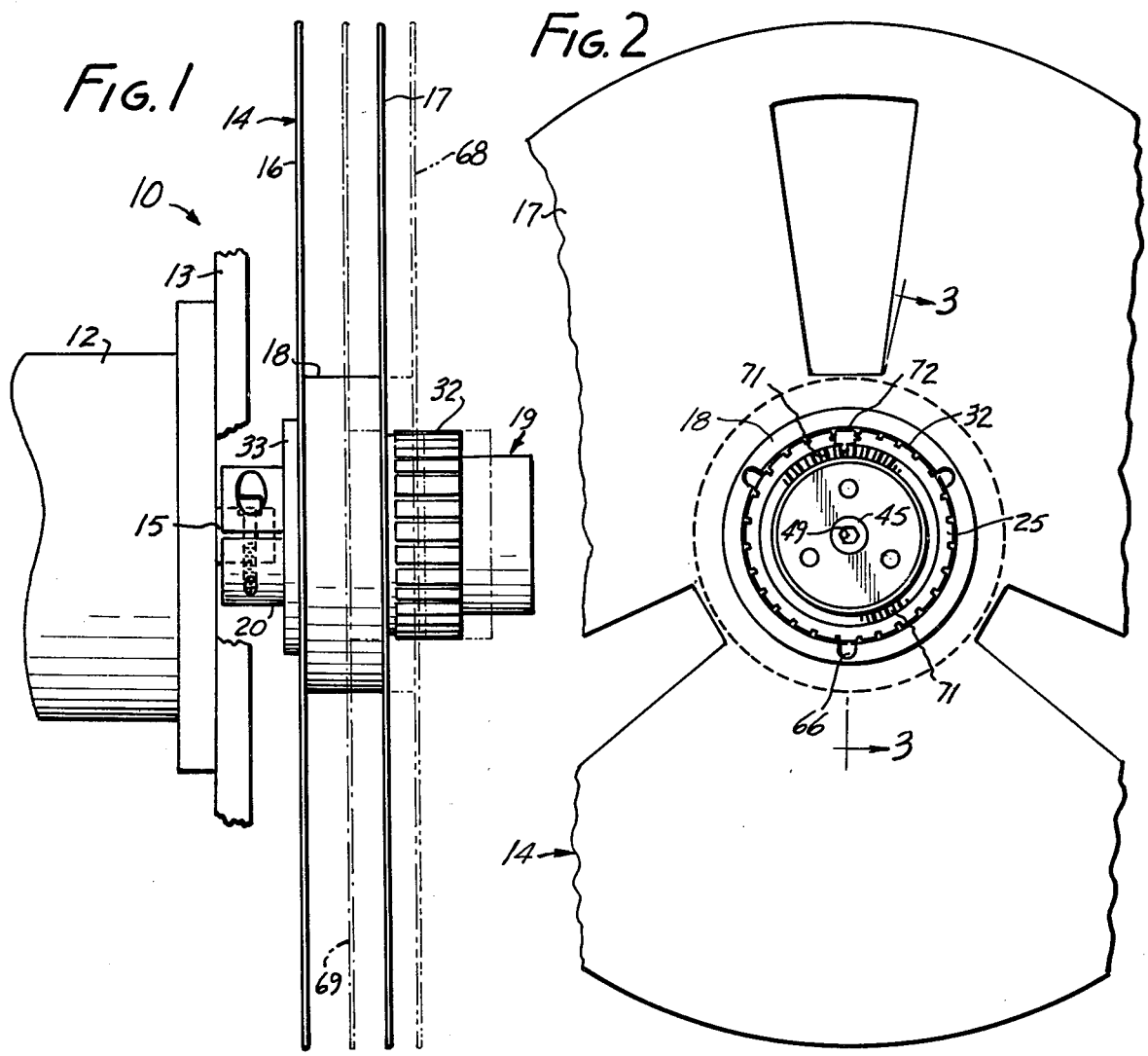
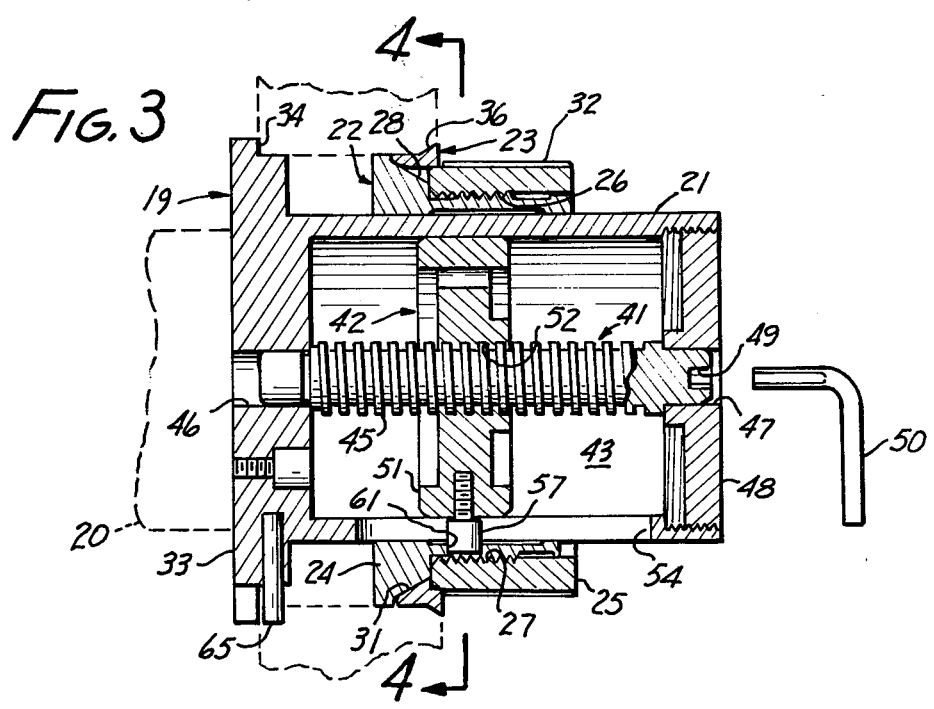

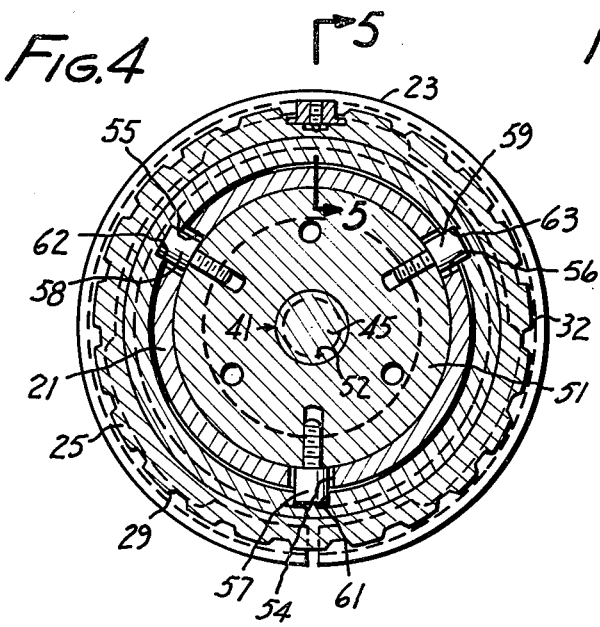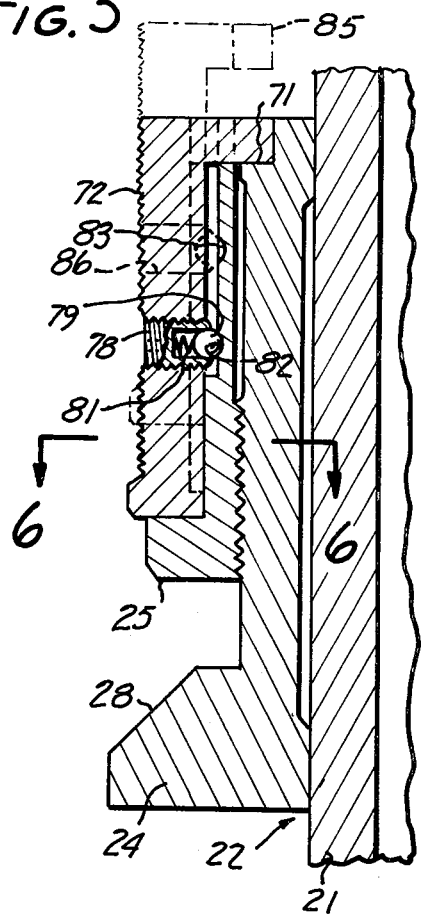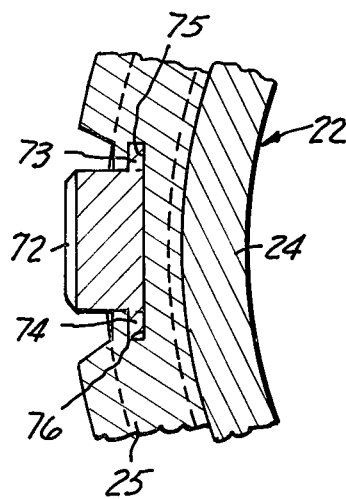

APPARATUS FOR MOUNTING A HOLLOW CYLINDRICAL MEMBER

BACKGROUND OF THE INVENTION

1. Field of the Invention

The subject invention relates to apparatus and systems for mounting a hollow cylindrical member or any one of several hollow cylindrical members of different depths. By way of example, the subject invention more specifically relates to apparatus for mounting any one of several reels of different depths or widths for winding and storing magnetic recording tape or other web-like material.

2. Prior-Art Statement

There exist various proposals for releasably retaining a tubular member with the aid of a chuck as may, for instance, be seen from U.S. Pat. Nos. 2,647,701, 2,749,133, 2,903,200, 3,108,757, 3,239,159, 3,510,082, and 4,079,896.

As may be seen from some of these prior patents, it is also known to render expansible chucks slidable on a shaft to adjust their position to the widths of different roll cores and to equip such chucks with clamping devices for arresting their position on the particular shaft.

In practice, such approaches fail where reel hubs or other hollow cylindrical members have to be releasably retained at a high positional precision.

In this respect, the advanced reel hold-down of U.S. Pat. No. 3,233,841 has been widely used for years in the most demanding environments, including high-precision instrumentation tape recorders. In practice, different applications and tasks frequently require different tape widths which, in turn, require reels of different hub depths. In high-precision applications, it was thus necessary to provide a differently dimensioned reel hold-down structure for tape width.

The problems engendered by this prior-art approach were not confined to the necessity of having to provide different reel hold-down structures, but extended to the necessity of having to exchange reel hold-down structures on the magnetic tape transport for every tape width change. In fact, the most troublesome operation in changing a tape transport to a different tape width involved the mounting and adjustment of the reel hold-down structures or chucks because of the high precision required in positioning tape reels with respect to tape controlling components of the transport. This requirement became particularly burdensome in multi-track magnetic tape recording machines.

In this respect, there also exists a reel hold-down structure or chuck including a split-ring and a pair of tensioning members having meshing threads and being coupled to the split-ring for releasably retaining the reel with the split-ring. The split-ring and another member for defining a reference surface have flange portions for receiving the center of the wheel therebetween.

Again, the latter type of prior-art chuck was encumbered by the drawbacks mentioned above in connection with different tape widths according to the cited U.S. Pat. No. 3,233,841.

SUMMARY OF THE INVENTION

It is a general object of this invention to overcome the above mentioned disadvantages.

It is a germane object of this invention to provide improved apparatus and systems for mounting reel hubs and other hollow cylindrical members.

It is a related object of this invention to provide improved apparatus and systems for mounting any one of several reel hubs or hollow cylindrical members having different depths.

It is also an object of this invention to provide improved apparatus and systems for adapting tape transports and similar equipment to different tape widths.

Other objects of this invention will become apparent in the further course of this disclosure.

From a first aspect thereof, the subject invention resides in apparatus for mounting a hollow cylindrical member, comprising, in combination, an arbor, a chuck longitudinally slidable on the arbor and including an expansible device for releasably retaining the hollow cylindrical member and a pair of tensioning members having meshing threads and being coupled to the expansible device for releasably retaining the hollow cylindrical member with the expansible device, and means coupled to the arbor and chuck for adjusting the position of the chuck to an axial dimension of the hollow cylindrical member, including a pair of driving members having meshing threads for varying the position of the chuck along the arbor, means for coupling one of the driving members to the arbor and means for coupling the other of the driving members to the chuck.

From another aspect thereof, the subject invention resides in apparatus for mounting a hollow cylindrical member, comprising, in combination, an arbor, a chuck mounted longitudinally slidable on the arbor for releasably retaining the hollow cylindrical member, self-lock means coupled to the arbor and chuck for automatically locking the slidably mounted chuck in any position on the arbor, and means connected to the self-lock means for selectively overcoming the automatic locking action and adjusting the position of the chuck on the arbor to an axial dimension of the hollow cylindrical member.

From yet another aspect thereof, the subject invention resides in a chuck for releasably retaining a hollow cylindrical member, comprising, in combination, an expansible device for engaging the hollow cylindrical member, a pair of tensioning members having meshing threads and being coupled to the expansible device for retaining the hollow cylindrical member with the expansible device, and means on the pair of tensioning members for releasably locking the tensioning members relative to each other.

BRIEF DESCRIPTION OF THE DRAWINGS

The invention and its various aspects and objects will become more readily apparent from the following detailed description of preferred embodiments thereof, illustrated by way of example in the accompanying drawings, in which like reference numerals designate like or functionally equivalent parts, and in which:

FIG. 1 is a side view, with parts broken away, of a reel motor and hold-down assembly with mounted tape reel, in accordance with a preferred embodiment of the subject invention;

FIG. 2 is a frontal elevation of the assembly and reel of FIG. 1;

FIG. 3 is a section, on an enlarged scale, taken along the line 3—3 of FIG. 2;

FIG. 4 is a section taken along the line 4—4 of FIG. 3;

FIG. 5 is a section, on an enlarged scale, taken along the line 5—5 of FIG. 4; and FIG. 6 is a fractional section taken along the line 6—6 of FIG. 5.

DESCRIPTION OF PREFERRED EMBODIMENTS

The reel motor and hold-down assembly 10 shown in the drawings has a reel drive motor 12 attached to a base plate or frame 13 of a tape transport. By way of example, the transport may belong to an instrumentation tape recorder or to other magnetic tape recording equipment.

In accordance with conventional practice, the reel motor 12 rotates or drives a tape reel 14 via a motor output shaft 15. The reel has a pair of circular flanges 16 and 17 attached to a hollow cylindrical member 18 which forms the center or core of the reel 14 and is frequently referred to as "hub" or "spool".

The reel 14 is releasably retained by or mounted on a reel hold-down structure 19 which, in turn, is attached to the motor output shaft 15 via a clamp 20 for rotation of the structure 19 and reel 14 by or with the motor shaft 15. In the context of the assembly shown in FIGS. 1 and 2, the structure 19 is frequently referred to as "reel hub". However, in view of the fact that the member 18 of the reel 14 may be referred to as "reel hub", and in view of the broad utility of the structure 19, the term "hold-down structure" is herein preferred.

In its broad utility, the hold-down structure 19 constitutes an apparatus for mounting a hollow cylindrical member, such as the reel hub 18 or other cylindrical members, especially those that occur at different widths or depths.

Also, the hold-down structure 19 in its broad application need not be rotating as in the case of the reel motor assembly shown in FIGS. 1 and 2, but may be stationary for releasably retaining hollow cylindrical members which in operation are stationary or are part of a bearing that permits rotation of the retained structure without rotation of the hold-down structure 19.

The hold-down structure 19 has an arbor 21 and a chuck 22 longitudinally slidable on that arbor. As seen in FIGS. 3 and 4, the chuck 22 includes an expansible device in the form of a split ring 23 for releasably retaining the hollow cylindrical member or reel hub 18, and a pair of tensioning members having meshing threads and being coupled to the expansible device or split ring 23 for releasably retaining the hollow cylindrical members with such expansible device or split ring. In particular, the pair of tensioning members of the chuck 22 have hollow cylindrical concentric inner and outer portions 24 and 25; the inner portion 24 having an external thread 26 and the outer portion having an internal thread 27 meshing with that external thread.

In the illustrated preferred embodiment, the chuck portion 24 is formed by an externally threaded ring member having a conical surface 28. Similarly, the chuck portion 25 is formed by an internally threaded tensioning ring rotatable relative to the member 24 for selectively actuating the split ring 23.

The split ring 23 has distributed over its circumference a number of wedge-shaped portions, one of which is seen at 31 in FIG. 3. The tensioning ring 25 has a knurled or otherwise grooved outer surface 32 for facilitating manual engagement and rotation of the tensioning ring 25. In this manner, the wedge-shaped member 31 of the split ring 23 may be driven up the conical surface 28 for an engagement and releasable retention of a reel hub 18 by manual rotation of the tensioning ring 25 in a first sense. Conversely, the wedge-shaped portions 31 of the split ring 23 are permitted to slide down the conical surface 28 by rotation of the tensioning ring 25 in the opposite sense. Since the split ring 23 is in effect a strong circular spring, it disengages from a releasably retained reel hub if its wedge-shaped portions are permitted to ride down the conical surface 28. Consequently, the reel hub 18 with the remainder of the reel 14 may then be manually removed from the chuck.

The arbor 21 has a flange 33 which as best seen in FIG. 3 defines an annular reference surface 34 for receiving one side of any hollow cylindrical member or hub 18 positioned on the hold-down structure 19. The expansible device or split ring 23 also has a circular flange 36, and the pair of flanges 33 and 36 of the arbor 21 and chuck 22 or split ring 23 cooperate in practice in releasably retaining the cylindrical member or hub 18 therebetween.

No novelty is herein claimed for the provision of a reference surface 34 and of a chuck 22 with split ring 23, tensioning members 24 and 25 and retaining flange 36 as such. However, without the features presently to be described in detail, such a structure per se would be encumbered by the initially mentioned problems concerning accommodation of different tape width reels.

In order to overcome such disadvantages, the chuck 22 according to the subject invention is longitudinally slidable on the arbor 21 and structure is coupled to the arbor and chuck for adjusting the position of the chuck to an axial dimension of the hollow cylindrical member or hub 18.

In particular, the hold-down structure 19 according to the illustrated preferred embodiment includes a pair of driving members 41 and 42 having meshing threads for varying the position of the chuck 22 along the arbor 21.

In particular, and with reference to the illustrated embodiment, the arbor 21 is hollow cylindrical, including an axial hollow space 43 in which the driving members 41 and 42 are located.

Also in accordance with the illustrated preferred embodiment of the subject invention, the chuck driving member 41 includes a lead screw 45 extending in the hollow space 43 coaxially to the arbor 21. One end of the lead screw 45 is rotatable in a bearing 46 provided by the arbor 21 at the flange 33. Similarly, the other end of the lead screw 45 is rotatable in a bearing 47 provided by an end plate 48 removably threaded into the outer free end portion of the arbor 21.

The lead screw 45 has a hexagonal socket 49 at the outer end thereof for manual rotation with a socket wrench 50. Rotary motion of the lead screw 45 is converted to translatory motion of the chuck 22 with a carrier 51 which, in the illustrated preferred embodiment, is formed by a disk having an internal thread 52 meshing with the lead screw 45 for travel of the carrier 51 along the lead screw upon rotation of that lead screw 45.

As seen in FIGS. 3 and 4, the arbor 21 has distributed slots 54, 55 and 56 in its hollow cylindrical wall. In principle, these slots could extend at an angle or in a curved relationship to the longitudinal axis of the arbor 21. However, in the illustrated embodiment, the slots 54 to 56 extend in parallel to that longitudinal axis.

Three cylindrical head screws 57, 58 and 59 extend through the slots 54, 55 and 56. These screws 57 to 59 are radially threaded into the carrier disk 51. In this manner, the screws 57 to 59 prevent rotation of the carrier disk 51 relative to the arbor 21 during rotation of the lead screw 45 and otherwise.

The screws 57 to 59 also serve as means for coupling the drive member 42 or carrier 51 to the chuck 22. In particular, the cylindrical heads of the screws 57, 58 and 59 are seated in corresponding holes 61, 62 and 63, respectively, provided in the inner ring member 24 of the chuck 22.

With reference to FIGS. 3 and 4, it is thus seen that the one driving member 41 is coupled to the arbor 21, while the other driving member 42 is coupled to the chuck 22. In the illustrated preferred embodiment, the latter coupling takes place through the slots 54 to 56.

In practice, the combined lead screw 45 and carrier disk 51 meshing therewith constitute self-lock means coupled to the arbor 21 and chuck 22 for automatically locking the slidably mounted chuck in any position on the arbor. The socket wrench 50, when inserted into the hexagonal socket 49 in the lead screw end, operates in conjunction with the rotary bearing providing flange 33 and end plate 48 as a means connected to the mentioned self-lock means for selectively overcoming the automatic locking action and adjusting the position of the chuck 22 on the arbor 21 to an axial dimension of the hollow cylindrical member or hub 18. The self-lock means again are coupled to the chuck 22 via screws 57 to 59 through slots 54 to 56.

In this manner, the chuck 22 is slidable and adjustable on the arbor 21 relative to the reference surface 34 and is automatically locked relative to that reference surface in any adjusted position on the arbor.

The axial dimension to which the chuck 22 may be adjusted by rotation of the leads screw 45 may be the width or depth of the reel hub 18. In this respect, the tape reel 14 with flanges 16 and 17 shown in FIG. 1 may, for instance, be taken as representing a reel for magnetic recording tape having a width of one inch or about 25 mm. The lead screw 45 is thus rotated with the tool 50 until the spacing between the flange 36 of the expansible member 23 and the reference surface 34 is appropriate to accommodate the hub 18 of a one inch reel. The tensioning ring or hollow knob 25 is then rotated so that the flange 36 of the split ring 23 clears the reel hub 18. The reel may then be inserted on the hold-down structure and the tensioning ring 25 tightened on the chuck 22 until the hub 18 of the inserted reel is retained relative to the reference surface 34 between the flanges 33 and 36. Rotation of the reel 14 relative to the hold-down structure 19 is prevented by at least one pin 65 which projects from the arbor 21 into a slot 66 in the reel hub 18. The reel motor 12 may thus rotate the hold-down structure 19 and mounted reel 14 via shaft 15 for winding magnetic recording tape onto the reel 14. Unwinding of tape from a tape supply on the reel 14 is similarly possible through rotation of the shaft 15.

Upon termination of a tape winding or unwinding operation, the tensioning ring or knob 25 may be rotated relative to the ring member 24 so that the wedge-shaped members 31 of the split ring 23 ride down the conical surface 28.

In this manner, the flange 36 can be brought to clear the inner diameter of the reel hub 18, whereupon the reel 14 may be removed from the hold-down structure 19. The process of reel insertion and removal may be repeated as often as desired. According to the subject invention, this also applies to the accommodation of reels for different tape widths, subject only to a minor adjustment effected via lead screw 45.

To illustrate this point, FIG. 1 shows a phantom outline 68 which illustrates one flange of a second reel for a tape width of one and one-half inches or about 38 mm. The other flange of such a second tape reel is again the flange 16 previously attributed to the one inch reel 14.

To accommodate the one and one-half inch reel, it is merely necessary to rotate the lead screw 45 with the inserted tool 50 so as to overcome the self-locking action between the lead screw 45 and carrier 51 for translatory motion of the chuck 22 along the arbor 21 away from the reference surface. Rotation of the lead screw 45 is stopped when the distance of the flange 36 to the reference surface 34 has become sufficient to accommodate the hub of a one and one-half inch tape reel. Such a reel may then be inserted onto the hold-down structure 19 and may be retained thereon by appropriate rotation of the tensioning ring 25 for an expansion of the split ring 23. Due to the self-locking action of the lead screw 45 and carrier 51, an accurate positioning and retention of any reel width or depth on the hold-down structure 19 is readily possible.

In this respect, and by way of further example, a phantom line 69 in FIG. 1 illustrates one flange of a reel for a tape width of one-half inch or 12.7 mm. Again, merely a rotation of the lead screw 45 with a tool 50 is required to adjust the chuck for a retention of that one-half inch reel. In this respect, the solidly illustrated flange 16 also indicates the inner flange of the one-half inch reel resting at the precision reference surface 34 via the particular reel hub releasably retained between flanges 33 and 36 of the arbor and axially adjusted chuck 22.

The subject invention and its illustrated preferred embodiment such avoid the most troublesome operation of changing the transport to different tape widths, in that they not only dispense with the previous necessity of having to provide differently dimensioned hold-down structure, but also dispense with the need of reestablishing a precision reference surface relative to other parts of the tape transport and delicate multi-track recording and playback heads. To the contrary, the universally usable hold-down structure 19 according to the subject invention has a precision reference surface 34 which, when once established is usable time and again for various tape width reels. Great cost and labor savings and high-precision operation improvements are thus possible with the employment of the subject invention.

The illustrated lead screw and carrier structure provide for an adjustment of the chuck 22 relative to the reference surface 34 in an infinite manner, as contrasted to distinct increments or steps.

In this manner, even tape reels for metric or other sizes which may not even be known to the designer of the hold-down structure 19 may be releasably retained therewith. In general term, the hold-down structure 19 consistutes thus a system for mounting any one of several hollow cylindrical members of different depths.

According to a further embodiment of the subject invention, the chuck 22 includes means for releasably arresting or locking the tensioning members 24 and 25 relative to each other to prevent an unintended loosening of any retained reel hub or other hollow cylindrical member.

In particular, the above mentioned concentric inner portion 24 of the pair of tensioning members of the chuck 22 has circumferentially arranged or distributed indentations 71. The chuck 22 includes an arresting member 72 engageable with the inner portion 24 at any of the indentations 71. The chuck 22 also includes means for movably mounting the arresting member 72 on the outer portion 25 for selective disengagement from, and engagement with, the inner portion 24.

In particular, the member 72 has lateral flanges 73 and 74 slidable in lateral slots 75 and 76, respectively, in the tensioning member or knob 25. A screw device 78 is threaded in a hole in the arresting member 72 and has a detent or ball 79 biased by a spring 81 against the tensioning member 25.

The tensioning member 25, in turn, has a first depression 82 and an axially spaced second depression 83 for alternative engagement by the biased ball 79.

In the locking position of the arresting member 72, in which that arresting member engages the inner chuck portion 24 at an indentation 71, the biased ball 79 retains the arresting member 72 in the solidly illustrated position shown in FIG. 5, in which the tensioning members 24 and 25 are locked relative to each other. On the other hand, the biased ball 79 may be moved out of the depression 82 by manually sliding the arresting member 72 as indicated by a phantom outline at 85 in FIG. 5. In such extended position, the biased ball 79 will retain the arrested member 72 disengaged from the inner chuck portion 24 via the second cavity 83 as indicated in dotted outline at 86. In that position 85 of the arresting member 72, the tensioning ring 25 may be rotated relative to the ring member 24 for a removal and insertion of a tape reel.

After a tape reel has been mounted on the hold-down 19 in the above mentioned manner, the arresting member 72 may be slid back from its extended position 85 until the biased ball 79 has reentered the cavity 82 and the arresting member has again engaged the inner portion 24 at an indentation 71.

The subject extensive disclosure suggests and renders apparent various modifications and variations within the spirit and scope of the subject invention to those skilled in the art.

I claim:

1. Apparatus for mounting a hollow cylindrical member, comprising in combination:
    an arbor;
    a chuck longitudinally slidable on said arbor and including an expansible device for releasably retaining said hollow cylindrical member and a pair of tensioning members having meshing threads and being coupled to said expansible device for releasably retaining said hollow cylindrical member with said expansible device; and
    means coupled to said arbor and chuck for adjusting the position of said chuck to an axial dimension of said hollow cylindrical member, including a pair of driving members having meshing threads for varying the position of said chuck along said arbor, means for coupling one of said driving members to said arbor and means for coupling the other of said driving members to said chuck.

2. Apparatus as claimed in claim 1, wherein:
    said arbor has a hollow space; and
    said driving members are located in said hollow space.

3. Apparatus as claimed in claim 1, wherein:
    said arbor has a hollow space and an elongate slot between said hollow space and said chuck on said arbor;
    said driving members are located in said hollow space; and
    said other driving member is coupled to said chuck through said slot.

4. Apparatus as claimed in claim 1, wherein:
    said arbor has an axial hollow space;
    said one driving member includes a lead screw extending axially in said hollow space; and
    said other driving member includes a carrier coupled to said chuck and having an internal thread meshing with said lead screw for travel of said carrier along said lead screw upon rotation of said lead screw.

5. Apparatus as claimed in claim 1, wherein:
    said arbor has an axial hollow space and an elongate slot between said hollow space and said chuck on said arbor;
    said one driving member includes a lead screw extending axially in said hollow space;
    said other driving member includes a carrier having an internal thread meshing with said lead screw for travel of said carrier along said lead screw upon rotation of said lead screw; and
    said means for coupling the other of said driving members include means for coupling said carrier to said chuck through said slot.

6. Apparatus as claimed in claim 1, wherein:
    said chuck includes means for releasably arresting said tensioning members relative to each other.

7. Apparatus as claimed in claim 1, wherein:
    said tensioning members have hollow cylindrical concentric inner and outer portions;
    said inner portion has an external thread;
    said outer portion has an internal thread meshing with said external thread;
    said inner portion has circumferentially arranged indentations;
    said chuck includes an arresting member engageable with said inner portion at any of said indentations; and
    said chuck includes means for movably mounting said arresting member on said outer portion for selective disengagement from, and engagement with, said inner portion.

8. Apparatus as claimed in claim 1, 2, 4 or 6, wherein:
    said arbor and said expansible device have flange portions for receiving said hollow cylindrical member therebetween.

9. Apparatus as claimed in claim 1, 2, 4 or 6 including:
    means for attaching said arbor to a rotatable shaft for rotation of said arbor, chuck and releasably retained hollow member.

10. Apparatus for mounting a hollow cylindrical member, comprising in combination:
    an arbor;
    a chuck mounted longitudinally slidable on said arbor for releasably retaining said hollow cylindrical member;
    self-lock means coupled to said arbor and chuck for automatically locking said slidably mounted chuck in any position on said arbor; and
    means connected to said self-lock means for selectively overcoming said automatic locking action and adjusting the position of said chuck on said arbor to an axial dimension of said hollow cylindrical member.

11. Apparatus as claimed in claim 10, wherein:
said arbor has a hollow space; and
said self-lock means are located in said hollow space.

12. Apparatus as claimed in claim 10, wherein:
said arbor has a hollow space and an elongate slot between said hollow space and said chuck on said arbor; and
said self-lock means are located in said hollow space and are coupled to said chuck through said slot.

13. Apparatus as claimed in claim 10, 11 or 12, wherein:
said arbor has a flange defining a reference surface for receiving one side of said hollow cylindrical member; and
said chuck is slidable on said arbor relative to said reference surface.

14. Apparatus as claimed in claim 10, 11 or 12, including:
means for attaching said arbor to a rotatable shaft for rotation of said arbor, chuck and releasably retained hollow member.

15. A chuck for releasably retaining a hollow cylindrical member, comprising in combination:
an expansible device for engaging said hollow cylindrical member;
a pair of tensioning members having meshing threads and being coupled to said expansible device for retaining said hollow cylindrical member with said expansible device; and
means on said pair of tensioning members for releasably locking said tensioning members relative to each other.

16. A chuck as claimed in claim 15, wherein:
said tensioning members have hollow cylindrical concentric inner and outer portions;
said inner portion has an external thread;
said outer portion has an internal thread meshing with said external thread;
said inner portion has circumferentially arranged indentations;
said chuck includes an arresting member engageable with said inner portions at any of said indentations; and
said chuck includes means for movably mounting said arresting member on said outer portion for selective disengagement from, and engagement with, said inner portion.

17. A chuck for releasably retaining a hollow cylindrical member, comprising in combination:
an expansible device for engaging said hollow cylindrical member;
a pair of tensioning members having meshing threads and being coupled to said expansible device for retaining said hollow cylindrical member with said expansible device; and
means on said pair of tensioning members for releasably locking said tensioning members relative to each other, including a manually slidable locking member located on one of said tensioning members for selectively engaging the other tensioning member.

* * * * *